United States Patent
Kuhlmann et al.

Patent Number: 5,232,078
Date of Patent: Aug. 3, 1993

[54] OVERHEAD CONVEYOR FOR ARTICLES TO BE CONVEYED SUSPENDED FROM A HANGER

[75] Inventors: Walter Kuhlmann, Lage; Klaus Niesen, Bielefeld, both of Fed. Rep. of Germany

[73] Assignee: Dürkopp Adler Aktiengesellschaft, Fed. Rep. of Germany

[21] Appl. No.: 878,033

[22] Filed: May 4, 1992

[30] Foreign Application Priority Data

May 2, 1991 [DE] Fed. Rep. of Germany ....... 4114283

[51] Int. Cl.⁵ .............................................. B65G 37/00
[52] U.S. Cl. .................................. 198/360; 198/465.4; 198/680
[58] Field of Search ............... 198/360, 365, 367, 370, 198/465.4, 486.1, 680, 477.1, 637

[56] References Cited

U.S. PATENT DOCUMENTS

| | | | |
|---|---|---|---|
| 2,846,049 | 8/1958 | Carlson | 198/465.4 X |
| 4,875,416 | 10/1989 | Duce | 198/465.4 X |
| 4,909,373 | 3/1990 | Geerts | 198/365 |

FOREIGN PATENT DOCUMENTS

| | | | |
|---|---|---|---|
| 0005539 | 11/1979 | European Pat. Off. | 198/465.4 |
| 1804775 | 6/1970 | Fed. Rep. of Germany | |
| 1781310 | 1/1971 | Fed. Rep. of Germany | |
| 3909002 | 7/1990 | Fed. Rep. of Germany | |
| 2220902 | 1/1990 | United Kingdom | 198/360 |

*Primary Examiner*—Robert P. Olszewski
*Assistant Examiner*—Cheryl L. Gastineau
*Attorney, Agent, or Firm*—Ostrolenk Faber Gerb & Soffen

[57] ABSTRACT

An overhead conveyor for articles to be transported suspended from hangers, the conveyor having at least one delivery point (A) at which the hangers are to be automatically delivered from a conveyor line into a second line. A swingable slide rail is provided at the delivery point, the rail being adapted to be brought from an upper position of rest into a lower inclined operating position by the weight of a clothing hanger present on it. When the slide rail is in its inclined operating position, a clothing hanger resting on it slides down the slide rail toward a receiving rod in the second line. When the slide rail is in its position of rest, hangers which are not to be delivered are able to pass by the slide rail without being obstructed.

19 Claims, 3 Drawing Sheets

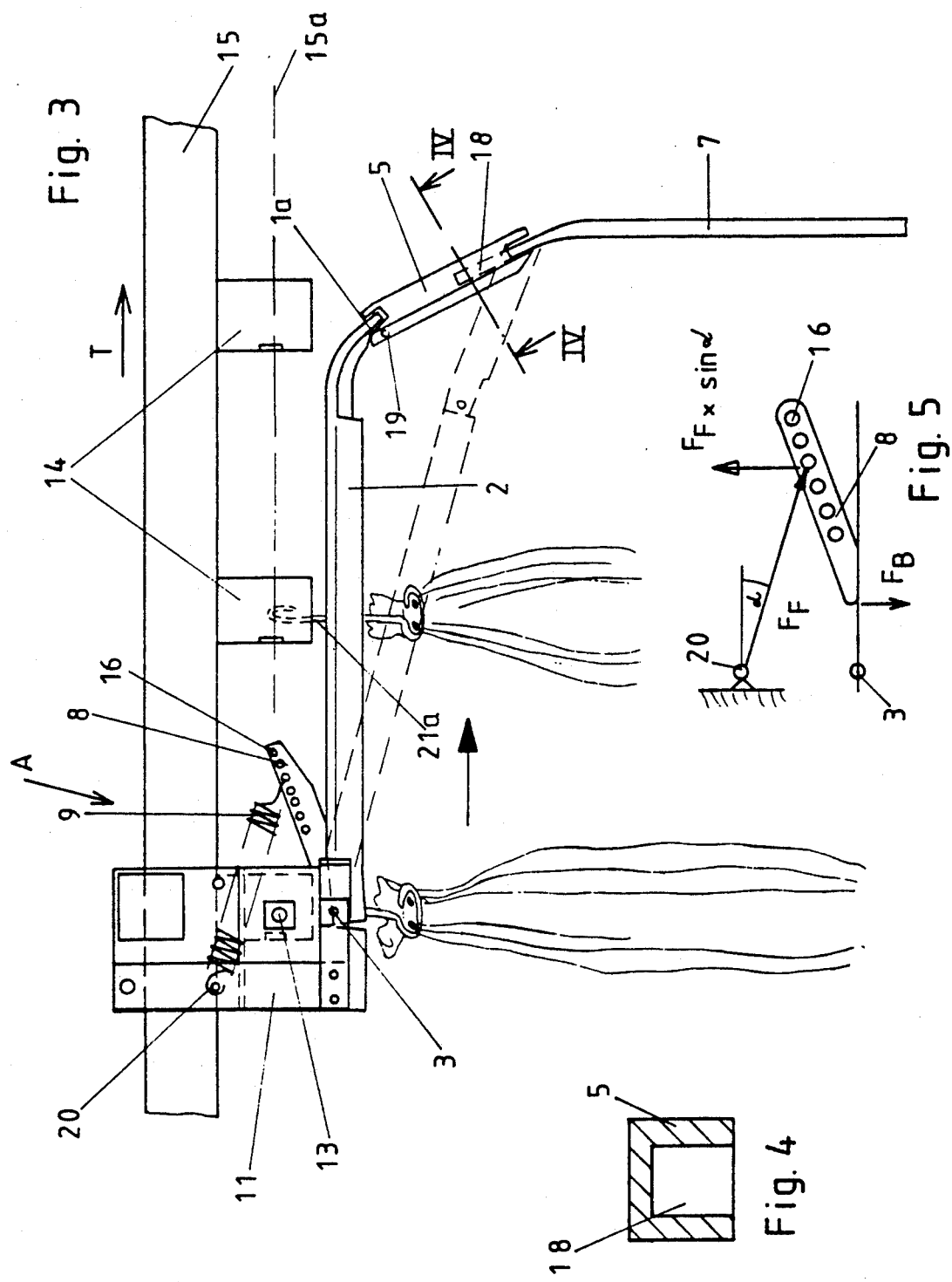

OVERHEAD CONVEYOR FOR ARTICLES TO BE CONVEYED SUSPENDED FROM A HANGER

BACKGROUND OF THE INVENTION

1. Field of the Invention

The present invention relates to an overhead conveyor for articles to be conveyed suspended from a hanger.

Such overhead conveyors are used, for instance, in clothing factories in order to transport the articles of clothing to storage or delivery points or to transport workpieces to a number of work stations at each of which different operations are carried out on the semi-finished products.

For this purpose, individual delivery points are provided within the overhead conveyor, at which points the hangers which bear the articles of clothing can be moved out of the main conveyor line so as to arrive at a work place located within a side branch or else at the place of storage.

2. Description of Related Art

Federal Republic of Germany OS 17 81 310 discloses an overhead conveyor in which the articles of clothing can be transported by clamps traveling on rollers along a rail.

European Patent OS 0 307 045 (corresponding to U.S. Pat. No. 4,909,373) discloses an overhead conveyor for articles of clothing suspended on hangers in which each clothing hanger is suspended in a respective carrier device. In this carrier device, the articles of clothing are transported within the main conveyance line of the conveyor. Within the conveyor there are delivery points at which the hangers are removed from the main direction of conveyance and delivered into a side branch or a delivery point.

In order to be able to remove the hanger, the suspension device is opened and the hanger drops by its own weight onto a downwardly inclined receiving rod, sliding along it until it has arrived at its destination.

In the design of such an overhead conveyor, it is endeavored to have the removal take place in the direction of the opening in the hanger hook since, in such case, the receiving rod need not be structured to be swingable out of the direction of transport; but rather, hangers which are not to be removed at a removal point can, via the opening in the hanger hook, pass by the rod.

In order to assure the operability of an overhead conveyor having a delivery point arranged in this manner, the hanger hook must be made relatively long so that hangers which are not to be removed, particularly when articles of clothing are suspended from them, can be moved along below the receiving rod while hanging from their hanger hooks, without striking against the receiving rod. As a rule, the hanger hook is too short in, for instance, clothing hangers for carrying trousers, wherein the waist band is clamped between two wire yokes. As a result, the protruding waist band of the trousers comes against the receiving rod instead of passing beneath it, so there is a risk that either the hangers will be rocked so as to interfere with further transport, or that the protruding waist band will be soiled.

Federal Republic of Germany AS 18 04 775 discloses a bipartite removing device for an overhead conveyor, the device being adapted to be swung in the manner of a switch into the conveyor path of the hanger hooks. If the upper part of the switch is swung upward, the hanger hooks transported on the conveyor worm can pass by the delivery point unimpeded. When the upper part is swung downward, the removing device is closed and hanger hooks which are moved up to it are moved away in positive manner from the conveyor worm.

With this device, in order to assure operability, the hanger hook must be made relatively long. Furthermore, the hanger hook is lifted by the upper part of the switch before it is delivered into the other conveyor line. The conveyor path, accordingly, extends obliquely upward for a given distance. The distance in height can be overcome only by the kinetic energy inherent in the hangers, so that a given speed of transport must be maintained for operability.

SUMMARY OF THE INVENTION

The principal object of the invention is therefore to improve an overhead conveyor of this type so that even hangers having short hanger hooks can be reliably transported past the delivery point when they are not to be removed, and so that the ability to remove the hangers is independent of the speed of transport.

This object is achieved by an overhead conveyer according to one aspect of the invention, having at least one delivery point at which the hangers are automatically delivered from the conveyance path of a conveyor line into a second line extending at an angle thereto and the conveyor line is operatively connected with the second line via an inclined connecting rail along which the hanger hooks of the hangers slide, a slide rail being swingably attached to the delivery point between the conveyor line and the receiving rod of the second line. The slide rail is swingable as mentioned above, and has a position of rest in which it has been swung upward. With the slide rail in its position of rest, hangers whose hanger hooks are present in the conveyor line which are not to be delivered can pass beneath the slide rail unimpeded, even if the hanger hooks are short. The slide rail swings downward into its operating position in order to deliver hangers from the conveyor line to the second line.

For this purpose, the slide rail is advantageously arranged below the conveyor line between the tip of the transported hanger hook and the hanger. The weight of a hanger which is to be delivered causes the slide rail to swing from its position of rest into the operating position, thereby establishing an at least approximately linear connection between the receiving rod and the conveyor path via the slide rail.

This arrangement has the advantage that, in its position of rest, the slide rail can be horizontal or even point obliquely upward with respect to the direction of transport, so that even hangers having short hanger hooks can pass the delivery point unimpeded, the hangers and their contents passing beneath the slide rail and not striking the slide rail. The slide rail is moved downward only when a hanger is actually to be removed from the conveyor line and comes to bear on the slide rail, thereby establishing an obliquely downwardly extending plane along which the hanger hook can slide.

According to a further advantageous feature, a connecting rail which is pivotally connected to the slide rail and/or the receiving rod is arranged between the slide rail and the receiving rod. This development enables the jib which pivotally supports the slide rail to be automatically brought back into its position of rest soon after a hanger has been removed from the conveyor line.

The slide rail is preferably arranged on a swingable jib which is pulled into its position of rest by a tension spring which is fixed in position at one end, and the spring force acting on the jib is adjustable. By this feature, it is possible to set the force necessary to act on the jib in order to tilt it into its operating position.

In the disclosed embodiment, for the adjustment of the spring force, an obliquely upward extending spring clip is firmly arranged on the jib, and the spring clip is provided in its lengthwise direction with a plurality of holes into which the other end of the tension spring can be hooked. This development is advantageous for adjusting the displacement force. The spring force should preferably be adjusted so that the jib can be brought into its working position by the weight of a hanger whose hanger hook is resting on it. This feature ensures that the weight of a clothing hanger is in itself sufficient to move the slide rail downward.

According to a further feature of the embodiment, the connecting rail is fastened at one end to the slide rail of the jib while an opening provided in its cross-sectional profile at its other end can be placed so as to closely engage the receiving rod. This feature enables the connection between the slide rail of the upper receiving rod and the lower receiving rod to be as free as possible from transitions.

Other features and advantages of the present invention will become apparent from the following description of an embodiment of the invention with reference to the accompanying drawings.

BRIEF DESCRIPTION OF THE DRAWINGS

FIG. 3 is a side view of the overhead conveyor at the level of the delivery point, as seen in the direction of the arrow III in FIG. 1;

FIG. 4 is a cross-sectional view taken along the line IV—IV of FIG. 3; and

FIG. 5 is a force diagram for calculating the force of the spring in the overhead conveyor.

DETAILED DESCRIPTION OF AN EMBODIMENT OF THE INVENTION

Figure 1:
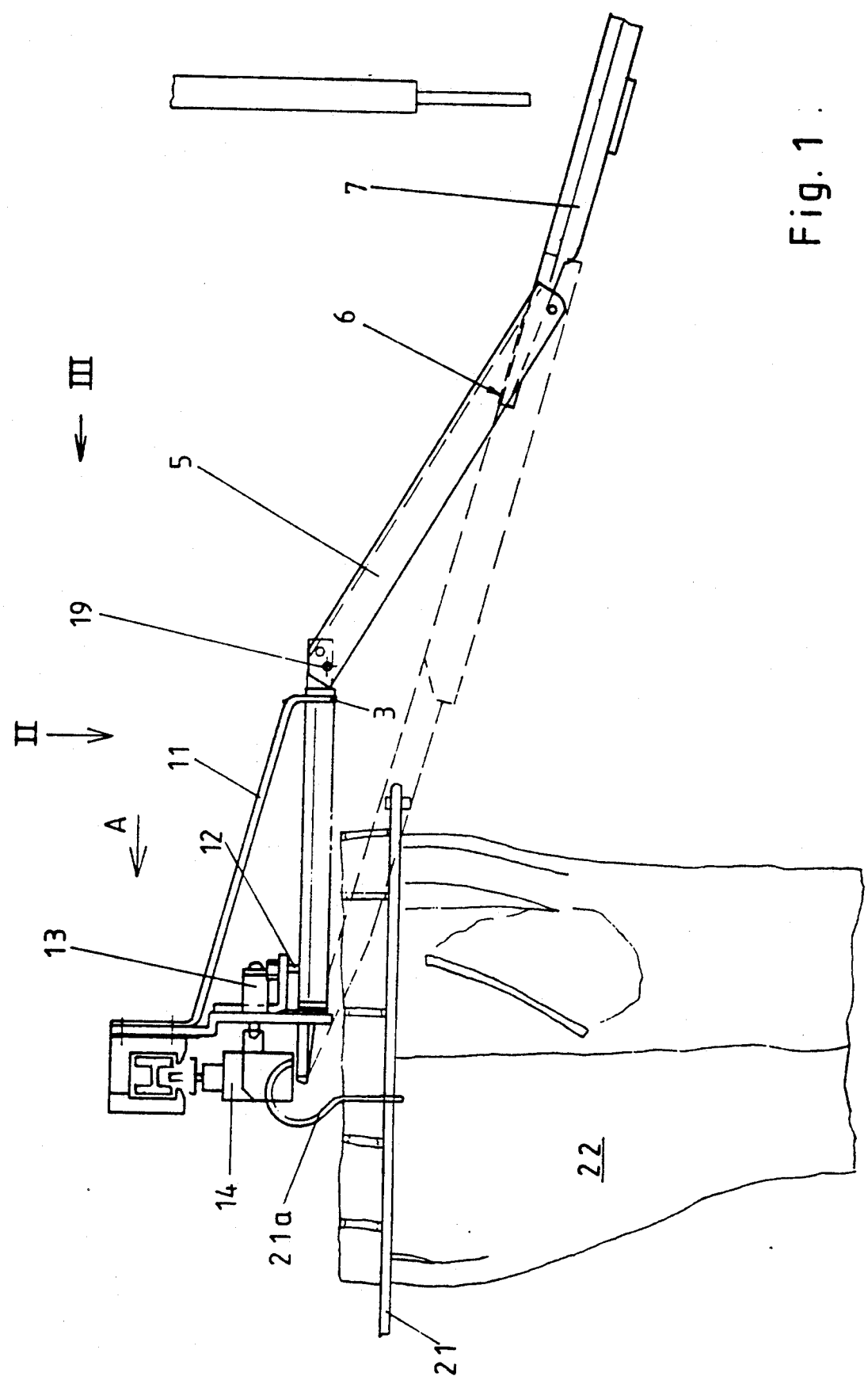
FIG. 1 is a cross-sectional view taken through the line of an overhead conveyor at a delivery point.

For reasons of simplicity, a complete overhead conveyor has not been shown in the drawing, but merely one delivery point within the overhead conveyor.

The overhead conveyor comprises a revolving conveyor line 15 which may include a revolving link chain, not shown in detail Hanging devices 14, such as those known from Federal Republic of Germany Patent 39 09 002 (corresponding to U.S. Ser. No. 07/494,125) in which the hooks 21a of the hangers 21 are suspended, may be fastened to the link chain. The hangers 21 are thus transported in a plane below the conveyor line 15, hereinafter referred to as the conveyance path 15a. As can be noted from FIGS. 1 and 2, the hangers 21 are hung in the hanging devices 14 so that the open side of the hanger hook 21a points in the direction of the slide rail 1. When a hanger is to be delivered at the delivery point A, the hanging device 14 is opened by a controllable release magnet 13 and the hanger 21 drops out.

At the delivery point A, a substantially triangular jib 2 is arranged, swingable around the pins 3, 3a on the holder 11 which is connected, fixed in space, to the overhead conveyor. The jib 2 has a bottom plate 4, which is triangular as seen in top view in FIG. 2, and has a perpendicularly outwardly extending receiving yoke 10 which engages the pins 3, 3a and is fastened to the bottom plate 4. On the bottom plate 4, a slide rail 1 is so arranged that, commencing just below the conveyance path 15a, it extends parallel to the direction of transport T of the overhead conveyor, and then in a direction which is at an angle thereto (see FIG. 2) and its end approaches the lower receiving rod 7.

Figure 2:
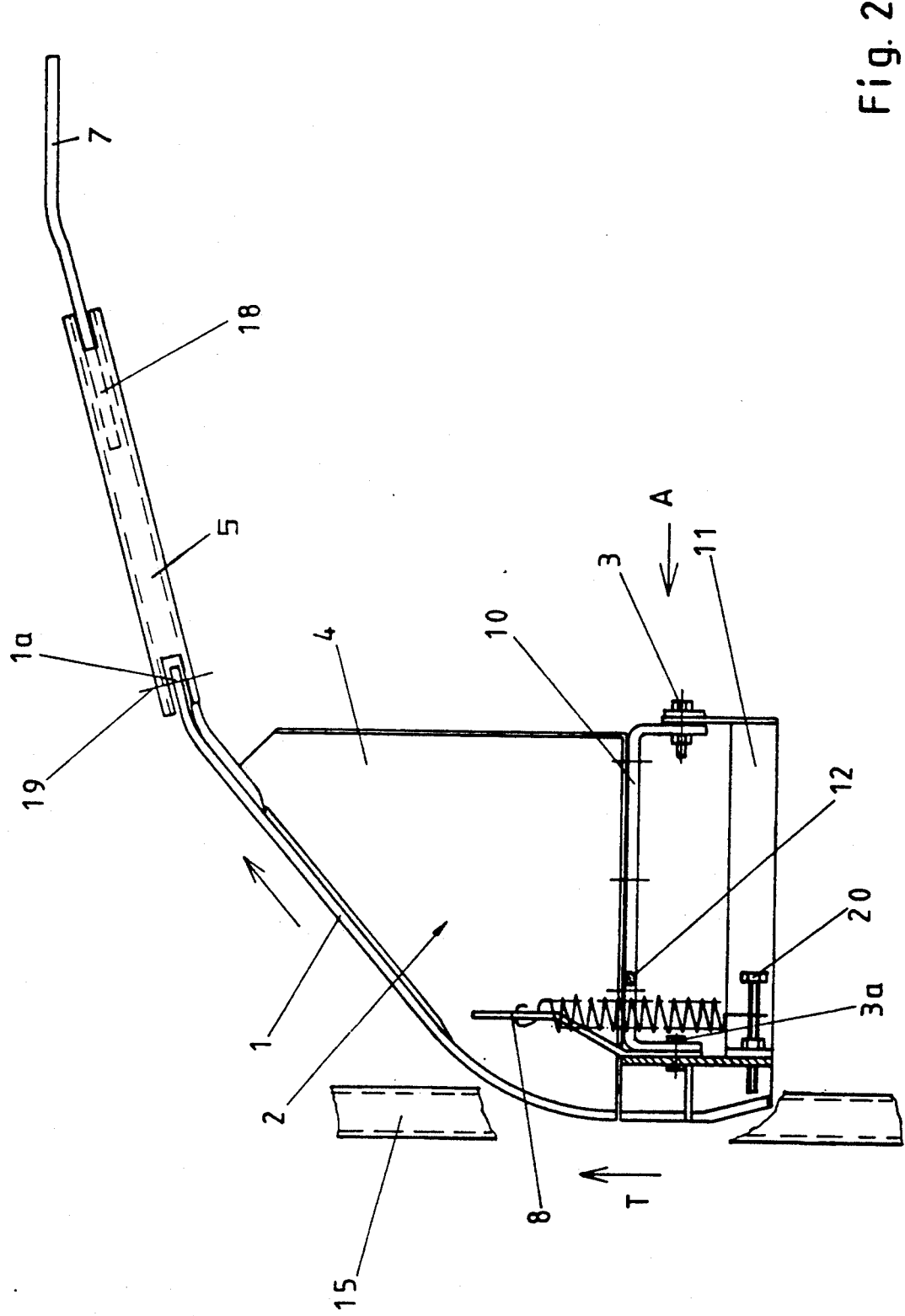
FIG. 2 is a top view of the delivery point, as seen in the direction indicated by the arrow II in FIG. 1.

As can be noted from FIG. 2, a spring clip 8 is rigidly fastened to the receiving yoke 10. This spring clip 8 has its free end extending obliquely upward and it is provided in its longitudinal direction with a plurality of holes 16, arranged one behind the other (FIG. 3). One end of the tension spring 9 can be hooked into one of these holes 16. The other end of the tension spring 9 is fastened to a pin 20 which is located above the tip of the spring clip 8 on the holder 11 so that the tension spring 9 is oblique in space (see FIG. 3).

The jib 2 is pulled by the tension spring 9, into its position of rest against a downward-directed stop 12 provided on the holder 11. As shown in FIG. 1, this stop, in the simplest case, includes an angle iron and a screw is threaded into the arm of the angle iron which extends parallel to the bottom plate 4.

In the embodiment shown, the position of rest of the jib 2 is selected in a plane parallel to the direction of transport T, just below the transport path 15a. In this way, the slide rail 1 lies in a plane which extends approximately through the center point of the partial circle formed by the hanger hook 21a. A clothing hanger 21 which is properly suspended in the hanging device 14 comes into position parallel to the plane of the direction of transport T. Therefore, a sufficient distance between the clothing hangers 21 and the slide rail 1, so as not to obstruct hangers which are not to be delivered, is obtained in the horizontal position of the jib 2 and slide rail 1 (see FIG. 1).

The connecting rail 5 is fastened via a joint 19 to the end 1a of the slide rail 1. At its other end, the connecting rail 5 has, within its cross section, an opening 18 by means of which the connecting rail 5 can be placed on the receiving rod 7. The opening 18 and/or the corresponding end of the lower receiving rod 7 are preferably shaped so that the connecting rail 5, when the jib 2 or the slide rail 1 is in its operating position, is aligned, practically without offset, with the lower receiving rod 7, enabling a hanger hook to slide smoothly from the connecting rail 5 onto the lower receiving rod 7. In FIGS. 1 and 3, the operating position of the jib 2 and slide rail 1 and of the connecting rail 5 is shown in dashed lines.

The force of the tension spring 9 acting on the jib 2 can be varied by selecting one of the plurality of holes 16 in the spring clip 8 which are arranged one behind the other. In this way the force which is necessary in order to swing the jib 2 from its position of rest into its operating position can be set. FIG. 5 shows, by way of example, the forces acting on the jib 2 at the time of the transfer of the hanger. In the drawing:

$F_F$ is the spring force;

$F_B$ is the force of the weight of the hanger 21; and $\alpha$ is the angle of inclination of the spring 9.

When equality of angular momentum around the joint 3 is established, the necessary angle of inclination $\alpha$ can be determined. Based thereon, the hole 16 for the attachment of the spring 9 which makes it possible to come as close as possible to the calculated angle $\alpha$ is then selected. Furthermore, in this way, tolerances in the stiffness of the spring, which are unavoidable in the manufacture of tension springs, can be compensated for.

The delivery of a hanger at the delivery point A is effected as follows:

When a given clothing hanger 21 is to be removed from the conveyance path 15a at the delivery point A, the release magnet 13, which is fixed in position at this delivery point, is activated when the corresponding hanging device 14 passes, so that the hanging device 14 opens and releases the clothing hanger 21. The latter then drops out of the hanging device 14 onto the slide rail 1 of the jib 2. Due to the weight of the hanger 21 or of the article of clothing 22 hung on it, the slide rail 1 and jib 2 are swung out of the position of rest downward into the working position. The connecting rail 5, which is connected by the joint 19 to the slide rail 1, also swings downward. Due to the incline produced, the clothing hanger hook 21a slides along the slide rail 1, as a result of which the latter drops further until the opening 18 of the connecting rail 5, which is pivoted to the slide rail 1, is resting completely on the lower receiving rod 7. In this way, a continuous incline is established and the clothing hanger 21 slides down onto the lower receiving rod 7 from where it can be delivered to its further destination, either a work place or a storage location, for example.

When the hanger 21 has slid sufficiently far from the slide rail 1, the jib 2 is pulled back up toward its position of rest by the force of the tension spring 9, out of the way of a following hanger, so that the following hanger can pass by the delivery point A without striking the jib 2.

However, even if the speed of conveyance along the conveyance path 15a is greater than the sliding speed with which the clothing hangers 21 slide along the slide rod 1 under the force of gravity, it is still possible for clothing hangers which are not to be delivered to be undisturbed as they pass by the delivery point A. If the jib 2 still has not been swung back by the spring force $F_F$ when a following clothing hanger, which is not to be delivered, needs to pass by the delivery point A, the hanger will strike against the jib, and the jib will be easily moved upward back into its position of rest, by the combined force of the hanger which has struck against it and the force of the tension spring 9. In this process, first, the following hanger comes into contact with the preceding hanger which is in the process of being delivered, thus pushing the latter faster along the slide rail 1, and then the following hanger moves the jib upward as just mentioned.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A conveyor for transporting articles on hangers which have hanger hooks, the conveyor having a conveyor line for engaging the hanger hooks, the conveyor defining a conveyance path which is followed by the hangers, and at least one delivery point at which the hangers are to be automatically delivered from the conveyance path into a second line extending at an angle thereto, the conveyor comprising:

a slide rail which is pivotally attached at one end near the delivery point;

an inclined connecting rail along which the hanger hooks of the hangers are slidable, which operatively connects the slide rail with a receiving rod of the second line;

means for supporting the slide rail in an upward position of rest so that hangers present in the conveyor line which are not to be delivered at the delivery point can pass the slide rail unimpeded, and a downward operating position in which the slide rail is in position to deliver hangers from the delivery point to the connecting rail;

the slide rail being arranged below the conveyor line between a distal tip of the transported hanger hook and the hanger;

the slide rail being swingable from the position of rest into the operating position under the force of the weight of the hanger which is to be delivered; and an at least approximately linear slide surface connection being formed between the receiving rod from the conveyor path via the slide rail and the connecting rail.

2. A conveyor according to claim 1, wherein the connecting rail is pivotally connected to the slide rail.

3. A conveyor according to claim 2, wherein the connecting rail is fastened at one end to the slide rail and has an opening defined by its cross-sectional profile at its other end for engaging the receiving rod so as to provide a smooth slide surface between the connecting rail and the receiving rod.

4. A conveyor according to claim 2, wherein the slide rail is arranged on a swingable jib which is urged into a position of rest by a tension spring which is fixed in position at one end and attached to said jib at the other end.

5. A conveyor according to claim 4, wherein the spring force of the tension spring acting on the jib is adjustable.

6. A conveyor according to claim 1, wherein the connecting rail is fastened at one end to the slide rail and has an opening defined by its cross-sectional profile at its other end for engaging the receiving rod so as to provide a smooth slide surface between the connecting rail and the receiving rod.

7. A conveyor according to claim 1, wherein the slide rail is arranged on a swingable jib which is urged into a position of rest by a tension spring which is fixed in position at one end and attached to said jib at the other end.

8. A conveyor according to claim 7, wherein the spring force of the tension spring acting on the jib is adjustable.

9. A conveyor according to claim 8, wherein the tension spring is attached to the jib by an obliquely upward extending spring clip which is firmly arranged on the jib, and the spring clip is provided in its lengthwise direction with a plurality of holes into which the second end of the tension spring can be selectively hooked for adjusting the spring force.

10. A conveyor according to claim 9, wherein the spring force is adjusted so that the slide rail can be brought into its adjusted so that the slide rail can be brought into its downward operating position by the weight of a hanger bearing on it.

11. A conveyor for transporting articles on hangers which have hanger hooks, the conveyor having a conveyor line for engaging the hanger hooks, the conveyor defining a conveyance path which is followed by the hangers, and at least one delivery point at which the hangers are to be delivered from the conveyance path into a second line, the conveyor comprising:

a rail along which the hanger hooks of the hangers are movable, which is pivotally fixed at one end near the delivery point;

the rail being operatively connected with the second line for permitting hangers to move from the rail to the second line; and means for supporting the rail in an upward position of rest so that hangers present in the conveyor line which are not to be delivered at the delivery point can pass the rail unimpeded, and a downward operating position in which the rail is in position to deliver hangers from the delivery point to the second line; wherein the rail is swingable from the position of rest into the operating position under the force of the weight of the hanger which is to be delivered.

12. A conveyor according to claim 11, wherein the rail is arranged below the conveyor line so as to be located between a hanger being transported and a distal tip of the hanger hook of the hanger.

13. A conveyor according to claim 12, wherein the hanger hook has a curved portion which engages the conveyor line, and the rail is located approximately centrally of said curved portion.

14. A conveyor according to claim 11, wherein the rail forms a smooth slide surface connection between the conveyor path and the second line.

15. A conveyor for transporting articles on hangers which have hanger hooks, the conveyor having a conveyor line for engaging the hanger hooks, the conveyor defining a conveyance path whch is followed by the hangers, and at least one delivery point at which the hangers are to be delivered from the conveyance path into a second line, the conveyor comprising:

a rail along which the hanger hooks of the hangers are movable, which is pivotally fixed at one end near the delivery point;

the rail being operatively connected with the second line for permitting hangers to move from the rail to the second line; and means for supporting the rail in an upward position of rest so that hangers present in the conveyor line which are not to be delivered at the delivery point can pass the rail unimpeded, and a downward operating position in which the rail is in position to deliver hangers from the delivery point to the second line; wherein the rail is operatively connected to the second line by a connecting rail which is pivotally connected to the rail.

16. An overhead conveyor according to claim 15, wherein the connecting rail is fastened at one end to the rail and has an opening defined by its cross-sectional profile at its other end for engaging the 17. A conveyor for transporting articles on hangers which have hanger hooks, the conveyor having a conveyor line for engaging the hanger hooks, the conveyor defining a conveyance path which is followed by the hangers, and at least one delivery point at which the hangers are to be delivered from the conveyance path into a second line, the conveyor comprising:

a rail along which the hanger hooks of the hangers are movable, which is pivotally fixed at one end near the delivery point;

the rail being operatively connected with the second line for permitting hangers to move from the rail to the second line; and means for supporting the rail in an upward position of rest so that hangers present in the conveyor line which are not to be delivered at teh delivery point can pass the rail unimpeded, and a downward operating position in which the rail is in position to deliver hangers from the delivery point to the second line; wherein the rail is arranged on a swingable jib which is urged into the position of rest by a tension spring which is fixed in postiion at one end and attached to said jib at the other end. second line so as to provide a smooth slide surface between the connecting rail and the second line.

18. An overhead conveyor according to claim 17, further comprising means for adjusting the spring force of the tension spring acting on the jib.

19. An overhead conveyor according to claim 18, wherein the tension spring is attached to the jib by an obliquely upward extending spring clip which is firmly arranged on the jib, and the spring clip is provided in its lengthwise direction with a plurality of holes into which the second end of the tension spring can be selectively hooked for adjusting the spring force.

* * * * *